United States Patent
O'Donoghue et al.

(10) Patent No.: US 10,186,749 B1
(45) Date of Patent: Jan. 22, 2019

(54) SYSTEMS AND METHODS FOR A REMOTE NEAR FIELD COMMUNICATION ANTENNA UNIT

(71) Applicant: QUALCOMM Incorporated, San Diego, CA (US)

(72) Inventors: Jeremy Robin Christopher O'Donoghue, Wokingham (GB); John Hillan, Alton (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/707,731

(22) Filed: Sep. 18, 2017

(51) Int. Cl.
*H01Q 1/22* (2006.01)
*H04B 5/00* (2006.01)
*H04B 5/02* (2006.01)
*H01Q 7/00* (2006.01)

(52) U.S. Cl.
CPC ............ *H01Q 1/2216* (2013.01); *H01Q 7/00* (2013.01); *H04B 5/0075* (2013.01); *H04B 5/02* (2013.01)

(58) Field of Classification Search
CPC ....... H04B 5/0025; H04B 5/0031; H04B 5/02
USPC ................................................ 455/41.1–41.3
See application file for complete search history.

(56) References Cited

U.S. PATENT DOCUMENTS

| | | | |
|---|---|---|---|
| 8,917,212 B2* | 12/2014 | Prather | H04B 17/10 343/703 |
| 9,345,050 B2* | 5/2016 | Nambord | H04B 5/0031 |
| 9,585,245 B2 | 2/2017 | Li et al. | |
| 9,800,294 B2* | 10/2017 | Roh | H04B 5/0031 |
| 2013/0095810 A1* | 4/2013 | Moreton | G06Q 20/3226 455/418 |
| 2013/0316648 A1* | 11/2013 | Rofougaran | H04W 4/18 455/41.1 |
| 2016/0127857 A1 | 5/2016 | O'Donoghue et al. | |
| 2016/0218414 A1 | 7/2016 | Samardzija et al. | |
| 2016/0241306 A1* | 8/2016 | Moon | H01Q 1/2208 |
| 2016/0249157 A1* | 8/2016 | Fine | H04W 4/80 |
| 2017/0102697 A1 | 4/2017 | Hassan et al. | |
| 2017/0126672 A1 | 5/2017 | Jang | |
| 2017/0179573 A1* | 6/2017 | Konanur | H01Q 1/2291 |
| 2017/0272127 A1* | 9/2017 | Jang | H04B 5/0081 |

* cited by examiner

*Primary Examiner* — Simon Nguyen
(74) *Attorney, Agent, or Firm* — Austin Rapp

(57) ABSTRACT

A near field communication (NFC) device is described. The NFC device includes an NFC back end. The NFC back end includes an application processor and a first transceiver. The NFC device also includes an NFC head end that is physically separated from the NFC back end. The NFC head end includes an antenna, a contactless front end, and a second transceiver.

30 Claims, 8 Drawing Sheets

SYSTEMS AND METHODS FOR A REMOTE NEAR FIELD COMMUNICATION ANTENNA UNIT

TECHNICAL FIELD

The present disclosure relates generally to communications. More specifically, the present disclosure relates to systems and methods for a remote near field communication (NFC) antenna unit.

BACKGROUND

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions and/or that perform functions faster, more efficiently or more reliably are often sought after.

Advances in technology have resulted in smaller and more powerful wireless communication devices. For example, there currently exists a variety of wireless communication devices such as portable wireless telephones (e.g., smartphones), personal digital assistants (PDAs), laptop computers, tablet computers and paging devices that are each small, lightweight and can be easily carried by users.

A wireless communication device may be configured to communicate using near field communication (NFC). In NFC, a reader device and a managed device may communicate using a magnetic coupling. In some scenarios, it may be difficult to correctly align the NFC antenna of a reader device. Benefits may be realized by implementing a remote near field communication (NFC) antenna unit.

SUMMARY

A near field communication (NFC) device is described. The NFC device includes an NFC back end. The NFC back end includes an application processor and a first transceiver. The NFC device also includes an NFC head end that is physically separated from the NFC back end. The NFC head end includes an antenna, a contactless front end, and a second transceiver.

Communication between the first transceiver and the second transceiver is not NFC. The first transceiver may include a first serial transceiver and the second transceiver may include a second serial transceiver.

The antenna may be configured to couple to the NFC head end via a flexible and/or adjustable coupling. The antenna may be replaceable and/or detachable.

The first transceiver and the second transceiver may be connected via a cable. The NFC back end and the NFC head end may exchange serial communications via the cable. The NFC back end and the NFC head end may transport power via the cable. In another implementation, the NFC back end and the NFC head end may communicate via a wireless link.

A method is described. The method includes transmitting or receiving signals in a first format over an interface between an NFC back end and an NFC head end that is physically separated from the NFC back end. The NFC back end includes an application processor and a first transceiver. The NFC head end includes an antenna, a contactless front end and a second transceiver. The method also includes transmitting or receiving signals in a second format over the antenna.

A non-transitory tangible computer readable medium is also described. The computer readable medium storing computer executable code. The computer readable medium includes code for causing an NFC device to transmit or receive signals in a first format over an interface between an NFC back end and an NFC head end that is physically separated from the NFC back end. The NFC back end includes an application processor and a first transceiver. The NFC head end includes an antenna, a contactless front end and a second transceiver. The computer readable medium also includes code for causing the NFC device to transmit or receive signals in a second format over the antenna.

An apparatus is also described. The apparatus includes means for transmitting or receiving signals in a first format over an interface between an NFC back end and an NFC head end that is physically separated from the NFC back end. The NFC back end includes an application processor and a first transceiver. The NFC head end includes an antenna, a contactless front end and a second transceiver. The apparatus also includes means for transmitting or receiving signals in a second format over the antenna.

DETAILED DESCRIPTION

Figure 1:
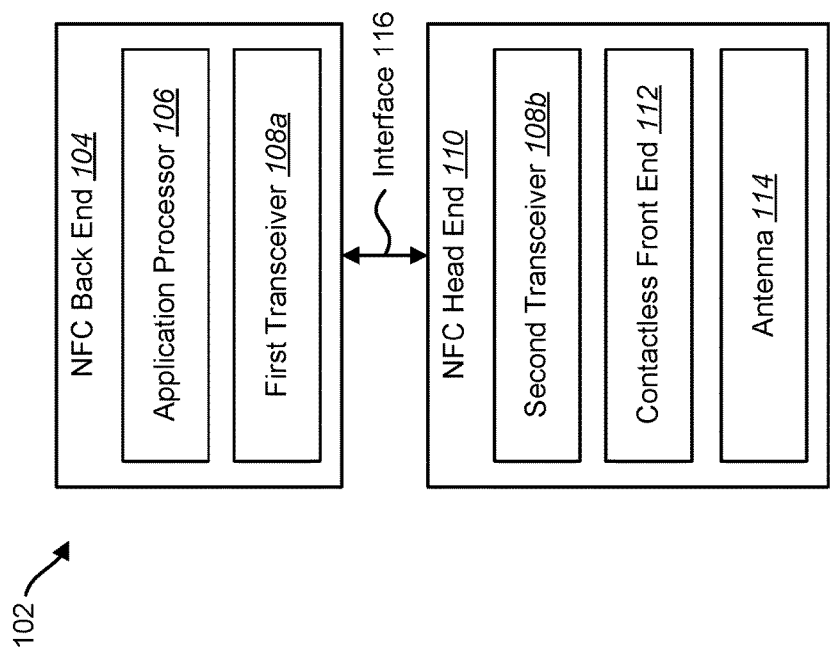
FIG. 1 is a block diagram illustrating one configuration of a near field communication (NFC) device configured with an NFC back end and a remote NFC head end.

Near field communication (NFC) is a communication protocol that uses magnetic coupling to enable communication between two devices. NFC provides many benefits. For example, NFC is attractive for provisioning, updating and managing very low power devices. Also, NFC is useful in devices for which environmental ingress protection is required.

Typical NFC systems available on the market are not ideally designed for some use cases. For example, NFC reader devices may be too bulky to access managed devices that are located in a confined space. Additionally, in some circumstances, an NFC reader device may not be able to operate in harsh environments (e.g., water, corrosive chemicals). Therefore, there is a need for an NFC antenna module that is better suited to use in cases in which access to an NFC-enabled system is restricted. This is especially important for those cases where health and safety considerations for the user of an NFC device are paramount.

According to the systems and methods described herein, an NFC antenna may be mounted in a remote head (referred to herein as an NFC head end). NFC system constraints mean that the NFC antenna must be co-located with an NFC contactless front end (CLF). Additionally, the NFC back end device to which the NFC head end is connected may be configured to provide a reasonable amount of power.

In an implementation, the NFC antenna may be interchangeable and/or reconfigurable. This may allow adaptation of the unit to different types of managed devices.

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a near field communication (NFC) device 102 configured with an NFC back end 104 and a remote NFC head end 110. The NFC device 102 may also be referred to as an electronic communication device, mobile device, mobile station, subscriber station, client, client station, user equipment (UE), remote station, access terminal, mobile terminal, terminal, user terminal, subscriber unit, etc. Examples of NFC devices 102 include laptop or desktop computers, card readers, cellular phones, smart phones, wireless modems, e-readers, tablet devices, gaming systems, etc. Some of these devices may operate in accordance with one or more industry standards.

Some wireless communication devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.11 (Wi-Fi) networks, Bluetooth (BT) networks, wireless Universal Serial Bus (USB) networks, NFC networks, etc.).

NFC is an inductively coupled communication. An NFC device 102 may communicate with a remote device using magnetic coupling. Therefore, the NFC device 102 may also be referred to as an inductively coupled communication device. The antenna 114 of the NFC device 102 produces an electromagnetic field (also referred to as a magnetic field or a radiated field (RF)) that is received by the remote NFC device.

The NFC device 102 and the remote NFC device may use one or more NFC signaling technologies to communicate with each other. The NFC signaling technologies may include NFC-A, NFC-B, NFC-F, NFC-V, etc. NFC-A may be referred to as type-A, NFC-B may be referred to as type-B and NFC-F may be referred to as type-F, and so forth. The NFC signaling technologies may differ in the modulation schemes employed.

The NFC device 102 may operate in either an initiator mode or a target mode. When in the initiator mode, the NFC device 102 may be referred to as an initiator NFC device (and also as a poller, polling device, proximity coupling device (PCD), initiator, reader or reader device). When in target mode, the NFC device 102 may be referred to as a target NFC device (and also as a listener, listening device, proximity integrated circuit card (PICC), target or managed device).

An initiator NFC device 102 may generate an electromagnetic field to which a target NFC device may be coupled. For example, in the case of NFC, the direction for the data flow in the NFC standards is characterized by having an initiator NFC device provide the electromagnetic field.

NFC provides many advantages. NFC offers an attractive mechanism for provisioning, updating and management of very low power devices. In particular, the fact that an NFC reader or peer device acting as an initiator can provide power to part of a remote NFC device may be beneficial in some use cases.

NFC further proves very attractive in devices for which environmental ingress protection is required. For example, it may be desirable to protect the NFC device 102 and/or a remote NFC device against water or corrosive chemicals that could damage the circuitry of the NFC device. Because NFC uses a magnetic coupling for communication and power transmission, NFC device 102 and/or a remote NFC device does not require any hole to be made in the device casing. By contrast, a wire-based (e.g., USB or similar) provisioning would require a hole in the casing of the reader device and the managed device. This hole may expose the reader device and the managed device to water or corrosive chemicals.

As a further advantage, the proximity nature of the NFC link means precise positioning is not required, as there is no need to plug the device into the remote unit. This is particularly advantageous if the NFC head end 110 is on the end of a long pole to reach remote units on the ceiling or behind a safety screen.

Typically, a reader device is a single (i.e., integrated) physical unit. This architecture is often necessary because reader devices tend to be installed in untrusted environments. For example, a reader device may be may be used at a point of sale, where a single physical unit inspires greater trust in the public.

However, in other use cases, it may be beneficial to have a reader device with a separate antenna 114. In these cases, it is beneficial to deliberately separate the main part of the reader device from a smaller and more portable NFC head end 110.

Use cases where NFC might be particularly attractive include, but are not limited to the following examples: management and provisioning of industrial Internet of things (IoT) devices; service update and management of vehicle telematic systems where connectors are often a source of unreliability and where environmental conditions can be harsh; devices that are immersed in water or other liquid.

One challenge with NFC devices is that it is possible that some devices to be managed do not offer convenient access by a typical NFC terminal (e.g., NFC reader device) in which the antenna 114 is integrated. Given that NFC magnetic coupling operates only at a very short range and is sensitive to physical aspects such as alignment, relative angles and position of the two coupling antennas, an NFC terminal may be too bulky or cumbersome to establish communication with a remote NFC device.

The systems and methods described herein provide for a remotely mounted NFC antenna 114. This greatly simplifies placing the NFC antenna 114 into a suitable position in a constrained space, and may also be beneficial where there are particular health and safety implications for access to the device to be managed. By physically separating the NFC antenna 114 from the reader device, the NFC antenna 114 may be packaged in a manner that optimizes the ability of a user to place the reader antenna 114 into physical proximity with an inconveniently located managed device.

There are two aspects of NFC system design that may influence the architecture of the NFC device 102, and which may not be readily apparent. A first aspect is that the contactless front end (CLF) 112 (also referred to as an NFC Controller) must be in close proximity to the antenna 114. The CLF 112 provides and/or receives a modulating signal to/from the antenna 114. It is not feasible simply to have long wires to the antenna 114 from a CLF 112 located in a reader device due to the strong influence of the resistance and inductance of the NFC antenna 114 on system performance. Additionally, the long wires would act as antennas themselves and would pick up a lot of distortion.

The second aspect that may influence the architecture of the NFC device 102 is providing power to the NFC head end 110. In an implementation, an interface 116 between the NFC reader device and the NFC antenna unit may be a cable between the main body of the reader device and the remote antenna unit. The cable may carry power as well as the normal digital signals between the application processor 106 and the CLF 112. For example, in NFC systems, the peak current requirements can approach several hundred milliamps or more during modulation.

It should be noted that in another implementation, the NFC head end 110 may have an internal battery. If it is necessary to seal the NFC head end 110 against fluid ingress, the battery could be charged by a sealed charging port, or it could be charged wirelessly.

The consequence of these design considerations is that the remote antenna unit may incorporate the CLF 112. Furthermore, the remote antenna unit may be configured to receive power remotely from the reader device.

The NFC device 102 includes an NFC back end 104 and an NFC head end 110 that is physically separated from the NFC back end 104. In one implementation, the NFC back end 104 may be a reader device. In other implementation, the NFC back end 104 may be included as a system within a reader device.

The NFC back end 104 may include an application processor 106. The application processor 106 within the NFC back end 104 may perform high-level digital processing for NFC operations. For example, the application processor 106 may be a processor in a tablet, smartphone or other computing device. The application processor 106 may be referred to as a host controller.

The NFC head end 110 may include the CLF 112 and the antenna 114. The CLF 112 may be configured to send/receive digital signals to/from the application processor 106. The CLF 112 may convert the digital signals to an analog NFC signal that is transmitted by the antenna 114. The CLF 112 may also receive analog NFC signals from the antenna 114, which are converted to digital signals and sent to the application processor 106.

To facilitate communication between the NFC back end 104 and the NFC head end 110, the NFC back end 104 may include a first transceiver 108a and the NFC head end 110 may include a second transceiver 108b. The first transceiver 108a and the second transceiver 108b may include a transmitter and a receiver.

The NFC back end 104 and the NFC head end 110 may communicate over an interface 116. In one approach, the interface 116 between the NFC back end 104 and the NFC head end 110 may be a cable interface. The interface 116 may use a serial communication protocol. One of the various protocols for wire-based communication that may be used to communicate on the interface 116 is Universal Serial Bus (USB), which offers good serial communications performance and a power transport. However, other protocols such as the Lightning interface, Firewire or even customized interfaces for use with especially long cables may be used.

In an implementation, the NFC back end 104 may establish an NFC Controller Interface (NCI) with the NFC head end 110. NCI is a protocol that can run over many different physical interfaces including universal asynchronous receiver/transmitter (UART), Inter-Integrated Circuit (I2C) and/or Serial Peripheral Interface (SPI).

In some cases, the complexity of the serial protocol may require a serial transceiver 108 separate from the CLF 112, as shown in FIG. 1. In other cases, it may be feasible to incorporate the serial transceiver 108 and power circuits directly on the CLF 112.

In another approach, the interface 116 may be a wireless interface. For example, the first transceiver 108a and the second transceiver 108b may communicate using radio frequency communication technologies (e.g., WiFi, Bluetooth, etc.) or optical wireless communications technologies. It should be noted that in this approach, the NFC head end 110 may be configured with a battery (not shown) that provides power for NFC operations.

It should be further noted that the first transceiver 108a and the second transceiver 108b do not communicate using NFC. In other words, the interface 116 between the NFC back end 104 and the NFC head end 110 does not use NFC (or other magnetically coupled communication) to communicate. NFC would not allow sufficient physical separation between the NFC back end 104 and the NFC head end 110.

In an implementation, the antenna 114 may be replaceable, detachable and/or may have different configurations. For example, the antenna 114 may be attached to the NFC head end 110 with a socket, screw fitting(s), latch or other coupling mechanism. The antenna 114 may be configured to be easily removable from the NFC head end 110 by a user. By being easily removable, a user may simply replace an old antenna 114 with a new antenna 114. It should be noted that the antenna 114 itself is normally a coil of relatively fixed size. The NFC head end 110 in which the antenna 114 is housed could, by contrast, be anything from a small probe to a long thin pole, hinged, curved, etc. according to the needs of its environment.

The antenna 114 may have different configurations based on an intended application. For example, different antennas 114 may be used for different applications. The antennas 114 may have different physical characteristics depending on the type of application the antenna 114 is used for. Therefore, the NFC head end 110 may be a generic device and the antennas 114 may be customized for a particular application.

In another implementation, the antenna 114 may be configured to couple to the NFC head end 110 via a flexible and/or adjustable coupling. In one approach, a flexible coupling may allow the antenna 114 to deflect from a neutral position in response to an applied force and return to the neutral position when the force is removed. In another approach, an adjustable coupling may allow the position of the antenna 114 in relation to the NFC head end 110 to be adjusted. In this approach, a user may adjust the position of the antenna 114 to a desired configuration, which may aid in maneuvering the antenna 114 in confined or awkward spaces.

As described above, an NFC antenna 114 mounted on a remote NFC head end 110 may be optimized for various kinds of tasks (e.g., provisioning, updates, maintenance). The NFC device 102 may, therefore, take advantage of the benefits of NFC, while overcoming the limitations of the technology.

Figure 2:
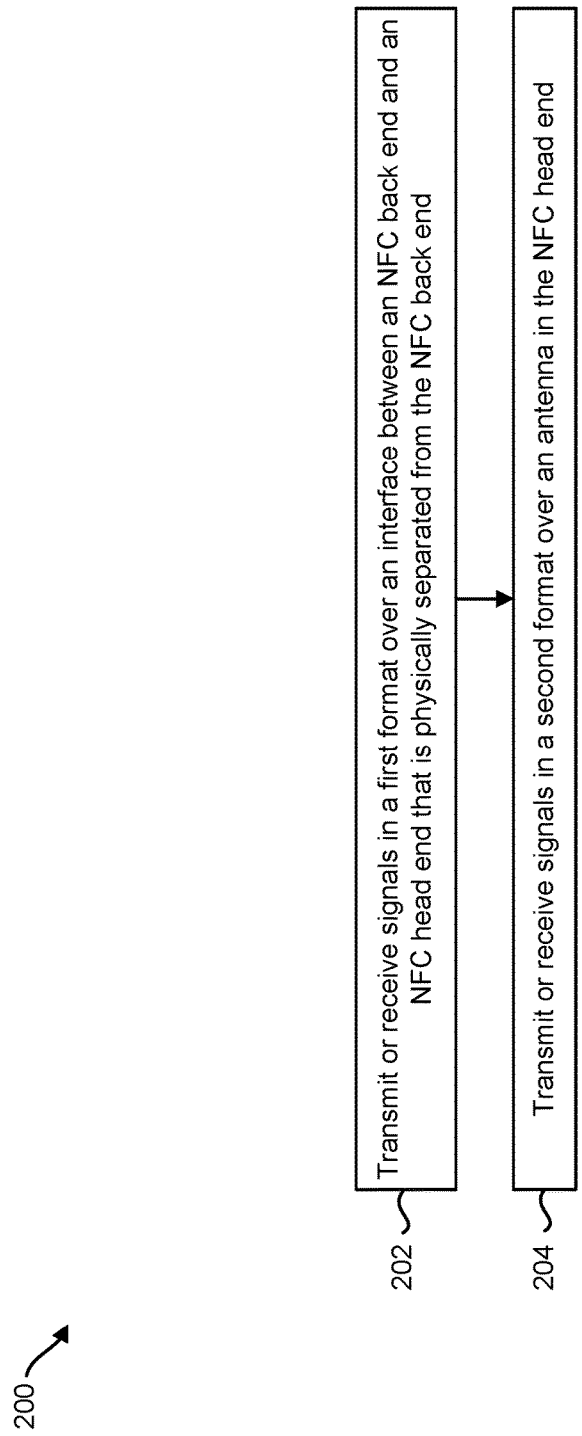
FIG. 2 is a flow diagram illustrating a method for implementing a remote NFC antenna unit.

FIG. 2 is a flow diagram illustrating a method 200 for implementing a remote near field communication (NFC) antenna unit. The method 200 may be implemented by an NFC device 102.

The NFC device 102 may transmit or receive 202 signals in a first format over an interface 116 between an NFC back end 104 and an NFC head end 110 that is physically separated from the NFC back end 104. The NFC back end 104 may include an application processor 106 and a first transceiver 108a. The NFC head end may include an antenna 114, a contactless front end (CLF) 112 and a second transceiver 108b.

The interface 116 between the NFC back end 104 and the NFC head end 110 may be a serial interface. The first transceiver 108a may be a first serial transceiver and the second transceiver 108b may be a second serial transceiver.

In an implementation, the first transceiver 108a and the second transceiver 108b may be connected via a cable. The NFC back end 104 and the NFC head end 110 may exchange serial communications via the cable. In an implementation, the interface 116 may be a USB interface, Lightning interface or other serial communication technology. The signals transmitted and/or received 202 in the first format may be digital signals. It should be noted that communication between the first transceiver 108a and the second transceiver 108b is not NFC.

The NFC back end 104 and the NFC head end 110 may also transport power via the cable. For example, the NFC back end 104 may provide power to the NFC head end 110 over the cable for use in NFC communication. The NFC head end 110 may use the power received from the NFC back end 104 to operate the second transceiver 108b and the CLF 112. The NFC head end 110 may also use the power received from the NFC back end 104 to generate a magnetic field for coupling with a remote NFC device.

In another implementation, the NFC back end 104 and the NFC head end 110 may communicate via a wireless link. For example, the first transceiver 108a and the second transceiver 108b may communicate using radio frequency communication technologies (e.g., WiFi, Bluetooth, etc.).

The NFC device 102 may transmit or receive 204 signals in a second format over an antenna 114 in the NFC head end 110. The second format signals may be analog NFC signals. The antenna 114 may generate a magnetic field to couple with a remote NFC device (e.g., a managed device).

In an implementation, the antenna 114 may be configured to couple to the NFC head end 110 via a flexible and/or adjustable coupling. In another implementation, the antenna 114 may be replaceable and/or detachable.

Figure 3:
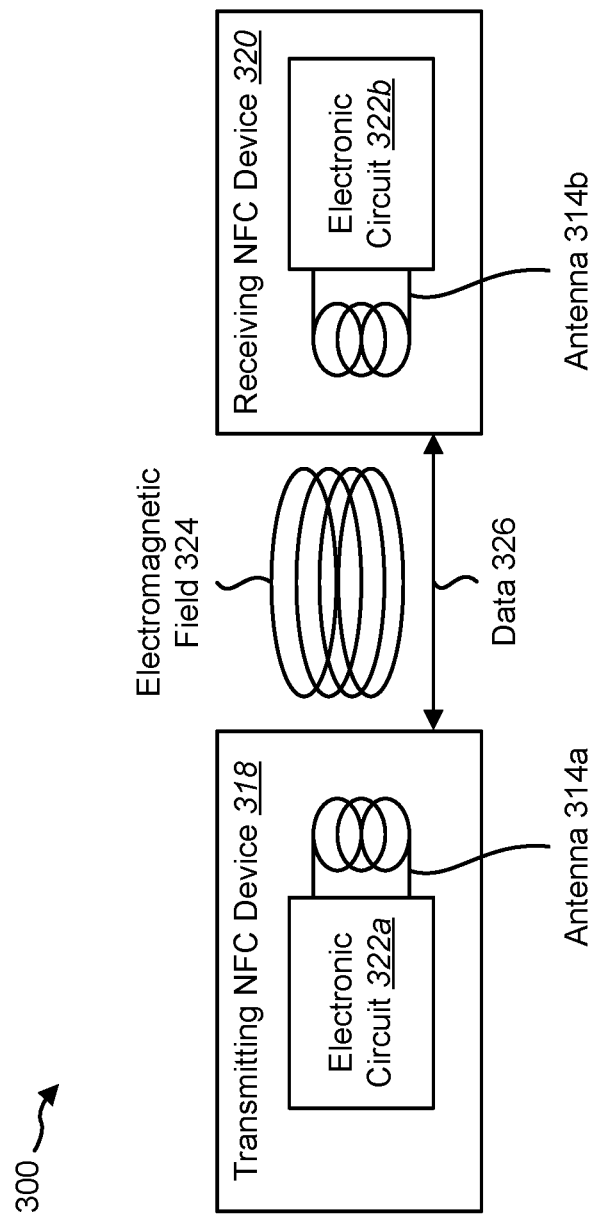
FIG. 3 is a block diagram illustrating one configuration of NFC communication in a wireless communication system.

FIG. 3 is a block diagram illustrating one configuration of NFC communication in a wireless communication system 300. A transmitting NFC device 318 and a receiving NFC device 320 may operate according to near field communication (NFC) protocols. The transmitting NFC device 318 may be implemented according to the NFC device 102 described in connection with FIG. 1. The receiving NFC device 320 may be a remote NFC device. Each device 318, 320 may include an antenna 314a-b connected to an electronic circuit 322a-b. During operation, the combination of two NFC devices (i.e., the transmitting NFC device 318 and receiving NFC device 320) may behave like a transformer.

NFC is an inductive coupling communication technology. The two NFC-capable devices 318, 320 may be separated by a distance. An alternating current may pass through a primary coil (i.e., the transmitting device antenna 314a) and create an electromagnetic field 324 (which may also be referred to as a radio frequency (RF) field or radiated field). The electromagnetic field 324 may induce a current in the secondary coil (i.e., the receiving device antenna 314b). The receiving NFC device 320 may use the electromagnetic field 324 transmitted by the transmitting NFC device 318 to power itself.

The configuration and tuning of both antennas 314a-b may determine the coupling efficiency from one device to the other device. During certain NFC transactions, the transmitting NFC device 318 may function as an initiator and the receiving NFC device 320 may function as a target, which are roles defined in the NFC standards. During other NFC transactions, the transmitting NFC device 318 may function as a target and the receiving NFC device 320 may function as an initiator.

The NFC transmitter of one device and the NFC receiver of the other device may be configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the near field of the radiated field.

An NFC device may include an NFC loop antenna 314. The NFC loop antenna 314 may provide a means for energy transmission and reception. As stated, an efficient energy transfer may occur by coupling a large portion of the energy in the near field of a transmitting antenna 314 to a receiving antenna 314 rather than propagating most of the energy in an electromagnetic wave to the far field.

An NFC-capable device may obtain sufficient data 326 to allow for communications to be established. One form of communications that may be established is an international standards organization data exchange protocol (ISO-DEP) communication link. Another form of communications that may be established is NFC-DEP. Communications between the NFC devices may be enabled over a variety of NFC radio frequency (RF) technologies, including but not limited to, NFC-A, NFC-B, NFC-F, etc. For simple devices such as IoT sensors, lights, monitors, the communication may be in a proprietary format.

Figure 4:
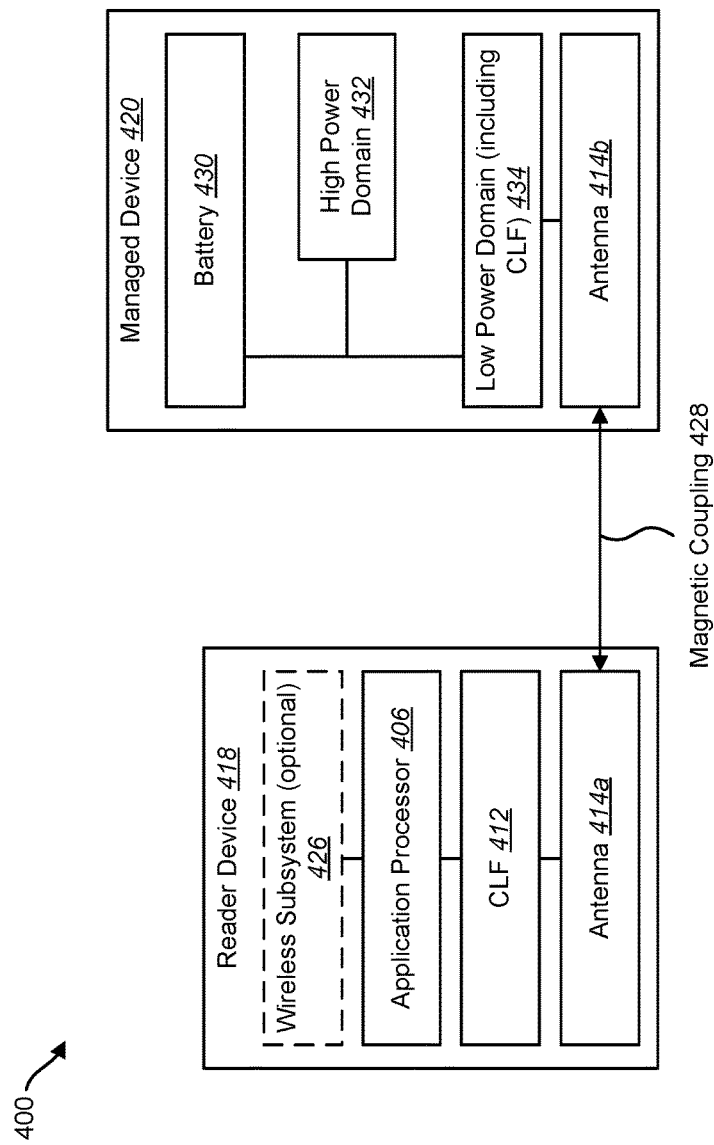
FIG. 4 is a block diagram illustrating a configuration of an NFC system.

FIG. 4 is a block diagram illustrating a configuration of an NFC system 400. FIG. 4 shows typical components of a conventional NFC system 400. In NFC, a reader device 418 may communicate with a managed device 420 using a magnetic coupling.

The reader device 418 is configured with a wireless subsystem 426 (optional), an application processor 406, a CLF 412, and an antenna 414a. The antenna 414a may be a loop antenna that is configured to generate a magnetic coupling 428 with the antenna 414b of a managed device 420.

The managed device 420 may include a battery 430, a high power domain 432 and a low power domain 434. The low power domain 434 may include a CLF that is coupled to the antenna 414b. Examples of the managed device 420 include sensors and/or IoT devices.

An example use case for an NFC system 400 includes a sensor monitoring system for an industrial process. For example, the sensor monitoring system may be used in a chemical factory. Other examples of a managed device 420 include video closed-circuit television (CCTV) cameras, burglar alarm sensors, heat sensors, thermostats, humidity sensors, etc.

An administrator may want to install a new sensor into the sensor monitoring system. In many cases, the sensors are made to operate in physically difficult environments. In this example, the managed device 420 may be a sealed device that contains a battery 430. It may also include a wireless communication system (WiFi or Bluetooth) (not shown) for transmitting status information. The managed device 420 may include sensors that are used for detecting temperature or some chemical characteristic (e.g., acidity).

An administrator may wish to provision the managed device 420 to join a wireless network. NFC offers a simple, inexpensive and convenient way of adding a managed device 420 into a wireless network. NFC may be used to make a managed device 420 trustworthy in the networks that it is part of. For example, NFC may be used to provision the managed device 420 with a cryptographic key and/or other provisioning information. This information may be needed to configure the managed device 420 to use a particular WiFi network, a particular Bluetooth network, a particular Bluetooth host, etc.

In some circumstances, the managed device 420 may be installed in an inaccessible location. Therefore, physical access to the managed device 420 may not be straightforward. For example, in the case of a sensor in a chemical factory, the managed device 420 may be submerged in a liquid. In a heating, ventilation and air conditioning (HVAC) system, the managed device 420 may be a temperature sensor mounted in the ceiling.

In typical NFC systems 400, the reader device 418 is a single unit that includes the antenna 414a. In an industrial scenario, the reader device 418 may be a ruggedized and bulky device. This configuration may be problematic in scenarios where physical access to the managed device 420 is limited. It may be quite inconvenient to get a bulky reader device 418 into certain locations. For example, if the managed device 420 is a sensor that is mounted deep within the engine compartment of an automobile, it may be physically difficult to place a reader device 418 inside the engine while also aligning the antennas 414a-b to establish magnetic coupling 428.

In another scenario, the managed device 420 may be located high in the ceiling of a building. In this scenario, a user may need to climb a ladder to reach the managed device 420, which may be time consuming and dangerous to the user.

In yet another scenario, the managed device 420 may be located in an environment that is hostile for the reader device 418 and/or the user. For example, the managed device 420 may be submerged a liquid (e.g., water, acid, etc.) or exposed to an extreme temperature (hot or cold). These environmental conditions could damage the reader device 418 and/or may be dangerous to a user of the reader device 418.

As can be seen by this discussion, benefits may be realized by having an antenna unit that is separate from the reader device 418.

Figure 5:
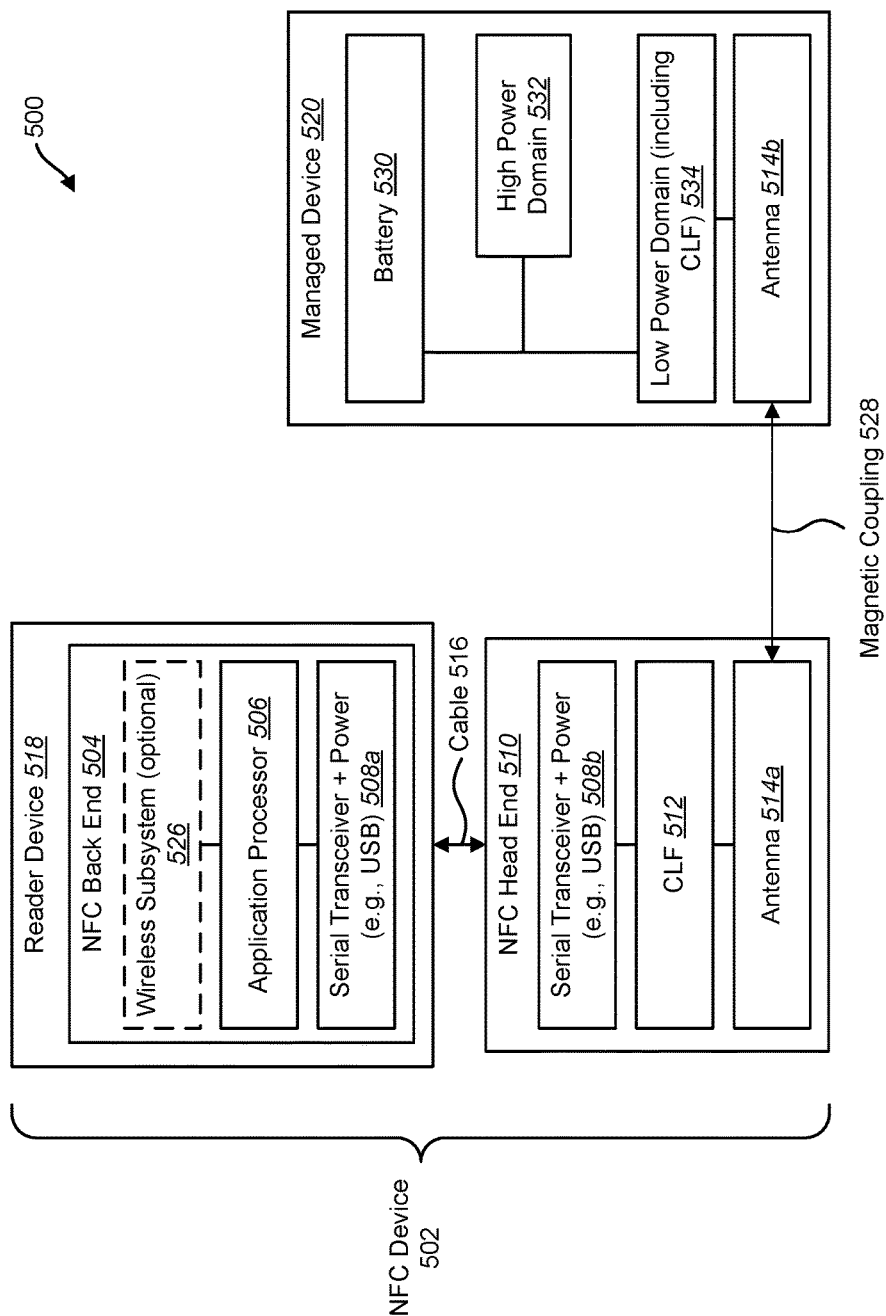
FIG. 5 is a block diagram illustrating a configuration of an NFC device that includes a reader device and a separate NFC head end.

FIG. 5 is a block diagram illustrating a configuration of an NFC device 502 that includes a reader device 518 and a separate NFC head end 510. The NFC device 502 may be implemented in accordance with the NFC device 102 described in connection with FIG. 1.

The reader device 518 (also referred to as an NFC back end 504) may be configured with a wireless subsystem 526 (optional) and an application processor 506. In this implementation, an NFC head end 510 is physically separate from the reader device 518. To facilitate communication and power transmission, the reader device 518 may include a serial transceiver and power module 508a. In an implementation, the serial transceiver and power module 508a may use USB, which provides both serial communication and power. Other serial communication protocols (e.g., Firewire, Lightning) may also be used.

The NFC head end 510 may include a serial transceiver and power module 508b. In an implementation, the serial transceiver and power module 508a may use USB (or another serial communication protocol). The NFC head end 510 may also include a CLF 512 and an antenna 514a. The antenna 514a may be a loop antenna that is configured to generate a magnetic coupling 528 with the antenna 514b of a managed device 520 in an NFC system 500.

The managed device 520 may include a battery 530, a high power domain 532 and a low power domain 534. The low power domain 534 may include a CLF that is coupled to the antenna 514b.

In this implementation, the reader device 518 may be connected to the NFC head end via a cable 516. The reader device 518 may communicate with the NFC head end 510 over the cable 516. For example, the reader device 518 may use its serial transceiver to send digital signals over the cable 516 to the NFC head end 510. Similarly, the NFC head end 510 may use its serial transceiver to send digital signals over the cable 516 to the reader device 518. The reader device 518 may provide power to the NFC head end 510 over the cable 516.

In another implementation (not shown), the reader device 518 may communicate with the NFC head end 510 using a wireless link (e.g., WiFi, Bluetooth, etc.). In this implementation, the NFC head end 510 may be configured with a battery.

Figure 6:
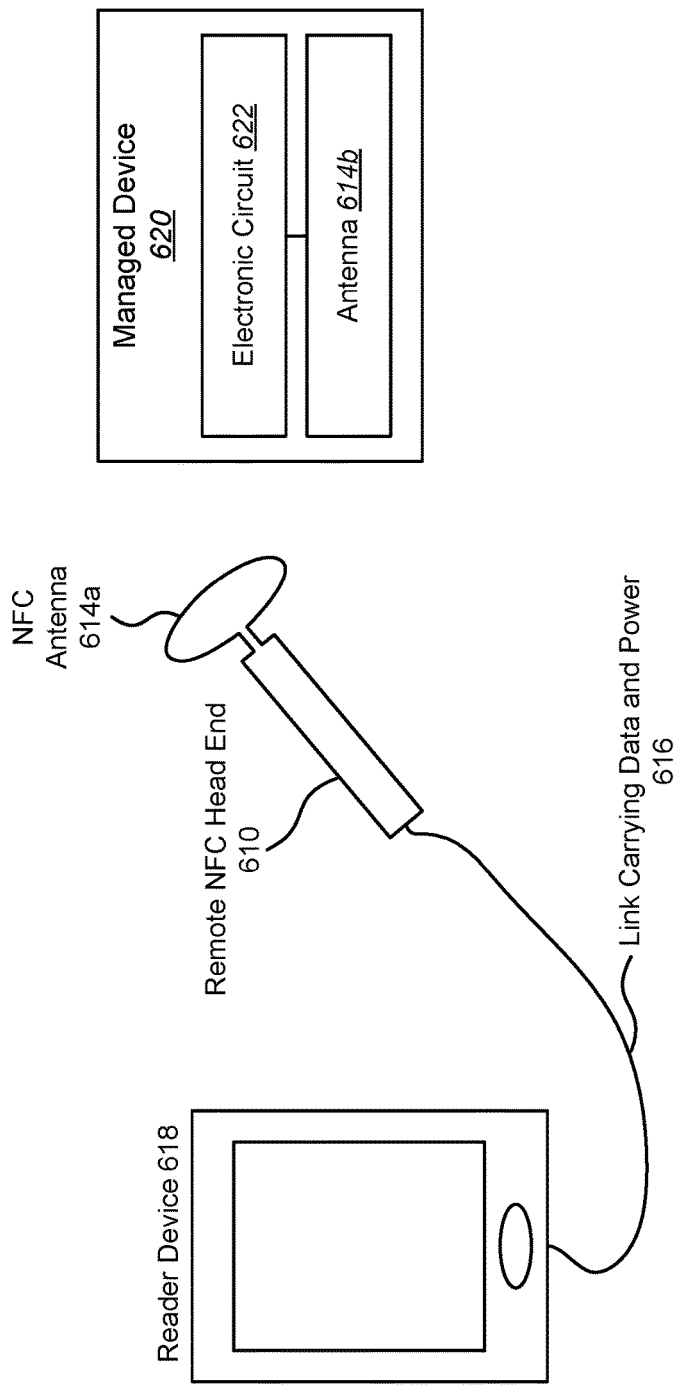
FIG. 6 illustrates a configuration of a reader device with a remote NFC head end.

FIG. 6 illustrates a configuration of a reader device 618 with a remote NFC head end 610. The reader device 618 may be implemented in accordance with the NFC back end 104 described in connection with FIG. 1. The remote NFC head end 610 may be implemented in accordance with the NFC head end 110 described in connection with FIG. 1.

In an implementation, the reader device 618 may be a computing device (e.g., tablet computer, smartphone, proprietary computing device). A remote NFC head end 610 may be connected to the reader device 618 with a link 616 carrying data and power. For example, the link 616 may be a cable 516. The remote NFC head end 610 may include an NFC antenna 614a that generates a magnetic field for communicating with a managed device 620.

The remote NFC head end 610 may include a CLF 112. The CLF 112 provides a modulating NFC signal to and/or receives a modulating NFC signal from the antenna 614a. The antenna 614a may generate a magnetic field with which a magnetic coupling to the antenna 614b of the managed device 620 may be established.

The managed device 620 may include an electronic circuit 622 with which the managed device 620 may perform NFC communication with the reader device 618 using the remote NFC head end 610. In an implementation, the managed device 620 may power the electronic circuit 622 using the magnetic field generated by the NFC antenna 614a of the remote NFC head end 610.

The reader device 618 may include a first transceiver 108a and the remote NFC head end 610 may include a second transceiver 108b. In an implementation, the reader device 618 may establish an NFC Controller Interface (NCI) with the remote NFC head end 610.

Figure 7:
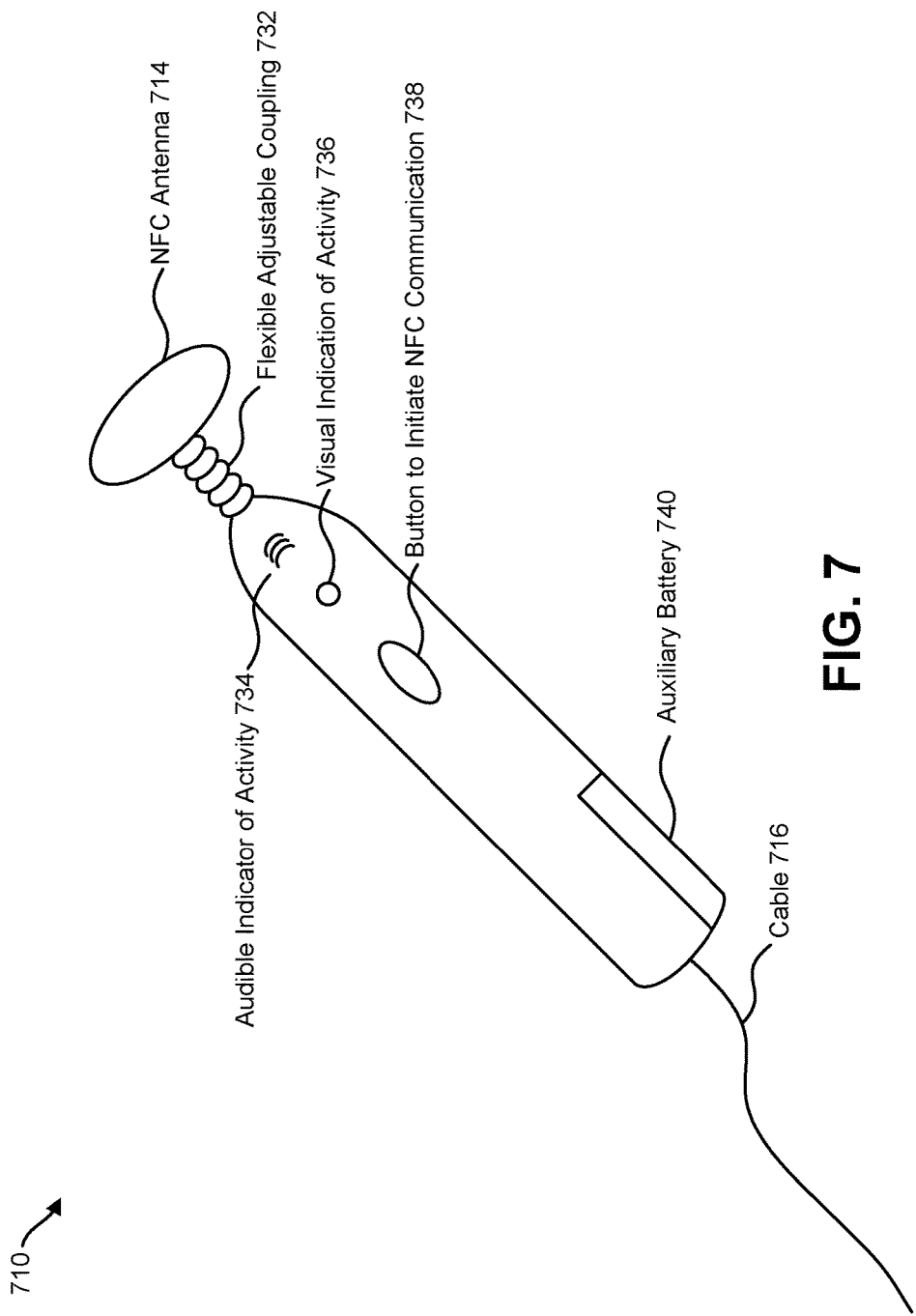
FIG. 7 illustrates a configuration of an NFC head end.

FIG. 7 illustrates a configuration of an NFC head end 710. The NFC head end 710 may be implemented in accordance with the NFC head end 110 described in connection with FIG. 1. For example, the NFC head end 710 may include a CLF 112 and a transceiver (corresponding to the second transceiver 108b of FIG. 1) to communicate with an NFC back end 104.

A number of design features are depicted in FIG. 7. These design features may improve the usability of the NFC head end 710. The NFC head end 710 may have an elongated body shape to increase the ability of a user to grip and maneuver the NFC head end 710. For example, the NFC head end 710 may have a tube or wand-like shape.

A cable 716 may connect the NFC head end 710 to a reader device. For example, the cable 716 may provide serial communication between the NFC head end 710 and the reader device. The cable 716 may also provide power to the NFC head end 710.

An auxiliary battery 740 or a charge storage device may be fitted into the body of the NFC head end 710. The auxiliary battery 740 or charge storage device may enable a higher peak antenna current to be supported in some use cases of NFC communication.

The NFC head end 710 may be fitted with a button 738 to initiate NFC communication. For example, a user may press the button 738 to enable data transfer to occur without the need for a user to interact directly with the reader device. Such interaction with the reader device may be inconvenient or even have safety concerns.

The NFC head end 710 may include a visual indication 736. For example, the visual indication 736 may be implemented with one or more light-emitting diodes (LEDs) or other light source. The visual indication 736 may be provided to show when data transfer is occurring, or to indicate error conditions such as loss of communication or poor link quality.

The NFC head end 710 may include an audible indication 734 of activity. The audible indication 734 may be implemented by a speaker or other sound emitting mechanism. The audible indication 734 may be provided to indicate data transfer termination or to warn the user of other errors.

The NFC antenna 714 may have different head configurations depending on the use case. The NFC antenna 714 may be detachable and/or replaceable to better couple with the antennas on different managed devices.

The NFC antenna 714 may be adjustable. For example, the NFC antenna 714 may be mounted on a flexible or adjustable coupling 732. In an implementation, the flexible/adjustable coupling 732 may be a hinged stem. The flexible/adjustable coupling 732 may facilitate operation in confined spaces. For example, the user may change the position (e.g., angle) of the NFC antenna 714 relative to the body of the NFC head end 710 to accommodate a space in which a managed device is located.

Figure 8:
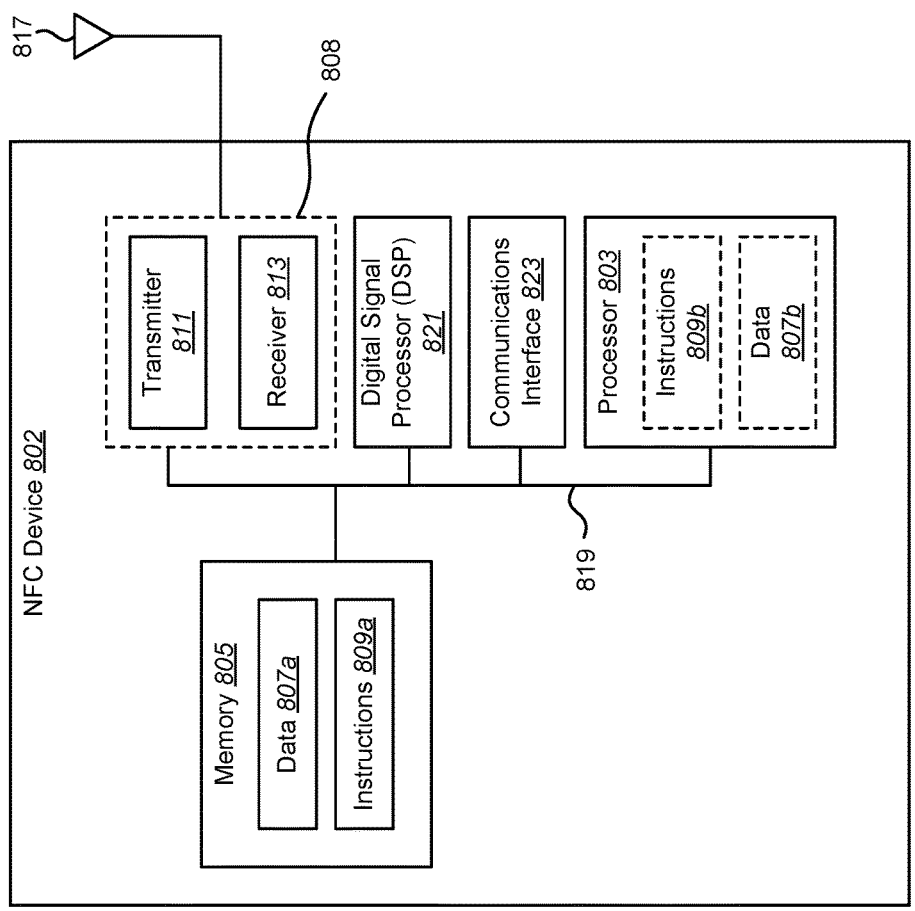
FIG. 8 illustrates certain components that may be included within an NFC device.

FIG. 8 illustrates certain components that may be included within an NFC device 802. The NFC device 802 may be an access terminal, a mobile station, a user equipment (UE), etc. For example, the NFC device 802 may be the NFC device 102 of FIG. 1.

The NFC device 802 includes a processor 803. The processor 803 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the NFC device 802 of FIG. 8, in an alternative configuration, a combination of processors (e.g., an ARM and DSP) could be used.

The NFC device 802 also includes memory 805 in electronic communication with the processor (i.e., the processor can read information from and/or write information to the memory). The memory 805 may be any electronic component capable of storing electronic information. The memory 805 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 807a and instructions 809a may be stored in the memory 805. The instructions may include one or more programs, routines, sub-routines, functions, procedures, code, etc. The instructions may include a single computer-readable statement or many computer-readable statements. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The NFC device 802 may also include a transmitter 811 and a receiver 813 to allow transmission and reception of signals to and from the NFC device 802 via an antenna 817. The transmitter 811 and receiver 813 may be collectively referred to as a transceiver 808. The NFC device 802 may also include (not shown) multiple transmitters, multiple antennas, multiple receivers and/or multiple transceivers.

The NFC device 802 may include a digital signal processor (DSP) 821. The NFC device 802 may also include a communications interface 823. The communications interface 823 may allow a user to interact with the NFC device 802.

The various components of the NFC device 802 may be coupled together by one or more buses, which may include a power bus, a control signal bus, a status signal bus, a data bus, etc. For the sake of clarity, the various buses are illustrated in FIG. 8 as a bus system 819.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A) and C (but not B), or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A near field communication (NFC) device, comprising:
    an NFC back end, wherein the NFC back end comprises an application processor and a first transceiver; and
    an NFC head end that is physically separated from the NFC back end, wherein the NFC head end comprises an antenna, a contactless front end configured to communicate digital signals with the application processor and to communicate analog NFC signals with the antenna, and a second transceiver configured to send and receive the digital signals with the first transceiver.

2. The NFC device of claim 1, wherein communication between the first transceiver and the second transceiver is not NFC.

3. The NFC device of claim 1, wherein the first transceiver comprises a first serial transceiver and the second transceiver comprises a second serial transceiver.

4. The NFC device of claim 1, wherein the antenna is configured to couple to the NFC head end via a flexible and/or adjustable coupling.

5. The NFC device of claim 1, wherein the antenna is replaceable and/or detachable.

6. The NFC device of claim 1, wherein the first transceiver and the second transceiver are connected via a cable, and wherein the NFC back end and the NFC head end exchange serial communications via the cable.

7. The NFC device of claim 6, wherein the NFC back end and the NFC head end transport power via the cable.

8. The NFC device of claim 1, wherein the NFC back end and the NFC head end communicate via a wireless link.

9. A method, comprising:
    transmitting or receiving digital signals over an interface between a near field communication (NFC) back end and an NFC head end that is physically separated from the NFC back end, wherein the NFC back end comprises an application processor and a first transceiver, and wherein the NFC head end comprises an antenna, a contactless front end configured to communicate the digital signals with the application processor and to communicate analog NFC signals with the antenna, and a second transceiver configured to send and receive the digital signals with the first transceiver; and
    transmitting or receiving the analog NFC signals over the antenna.

10. The method of claim 9, wherein communication between the first transceiver and the second transceiver is not NFC.

11. The method of claim 9, wherein the first transceiver comprises a first serial transceiver and the second transceiver comprises a second serial transceiver.

12. The method of claim 9, further comprising coupling the antenna to the NFC head end via a flexible and/or adjustable coupling.

13. The method of claim 9, wherein the antenna is replaceable and/or detachable.

14. The method of claim 9, wherein the first transceiver and the second transceiver are connected via a cable, and wherein the NFC back end and the NFC head end exchange serial communications via the cable.

15. The method of claim 14, wherein the NFC back end and the NFC head end transport power via the cable.

16. The method of claim 9, wherein the NFC back end and the NFC head end communicate via a wireless link.

17. A non-transitory tangible computer readable medium, the computer readable medium storing computer executable code, comprising:
    code for causing a near field communication (NFC) device to transmit or receive digital signals over an interface between an NFC back end and an NFC head end that is physically separated from the NFC back end, wherein the NFC back end comprises an application processor and a first transceiver, and wherein the NFC head end comprises an antenna, a contactless front end configured to communicate the digital signals with the application processor and to communicate analog NFC signals with the antenna, and a second transceiver configured to send and receive the digital signals with the first transceiver; and
    code for causing the NFC device to transmit or receive the analog NFC signals over the antenna.

18. The computer readable medium of claim 17, wherein the first transceiver comprises a first serial transceiver and the second transceiver comprises a second serial transceiver.

19. The computer readable medium of claim 17, wherein the antenna is configured to couple to the NFC head end via a flexible and/or adjustable coupling.

20. The computer readable medium of claim 17, wherein the antenna is replaceable and/or detachable.

21. The computer readable medium of claim 17, wherein the first transceiver and the second transceiver are connected via a cable, and wherein the NFC back end and the NFC head end exchange serial communications via the cable.

22. The computer readable medium of claim 21, wherein the NFC back end and the NFC head end transport power via the cable.

23. The computer readable medium of claim 17, wherein the NFC back end and the NFC head end communicate via a wireless link.

24. An apparatus, comprising:
    means for transmitting or receiving digital signals over an interface between a near field communication (NFC) back end and an NFC head end that is physically separated from the NFC back end, wherein the NFC back end comprises an application processor and a first transceiver, and wherein the NFC head end comprises an antenna, a contactless front end configured to communicate the digital signals with the application processor and to communicate analog NFC signals with the antenna, and a second transceiver configured to send and receive the digital signals with the first transceiver; and
    means for transmitting or receiving the analog NFC signals over the antenna.

25. The apparatus of claim 24, wherein the first transceiver comprises a first serial transceiver and the second transceiver comprises a second serial transceiver.

26. The apparatus of claim 24, wherein the antenna is configured to couple to the NFC head end via a flexible and/or adjustable coupling.

27. The apparatus of claim 24, wherein the antenna is replaceable and/or detachable.

28. The apparatus of claim 24, wherein the first transceiver and the second transceiver are connected via a cable, and wherein the NFC back end and the NFC head end exchange serial communications via the cable.

29. The apparatus of claim 28, wherein the NFC back end and the NFC head end transport power via the cable.

30. The apparatus of claim 24, wherein the NFC back end and the NFC head end communicate via a wireless link.

\* \* \* \* \*